US010653220B2

(12) United States Patent
Vanderhoof, Sr. et al.

(10) Patent No.: US 10,653,220 B2
(45) Date of Patent: May 19, 2020

(54) MODULAR MOBILE DEVICE CASE AND RELATED ACCESSORIES

(71) Applicant: Fidlco, LLC, Scottsdale, AZ (US)

(72) Inventors: John Vanderhoof, Sr., Scottsdale, AZ (US); John Vanderhoof, Jr., Scottsdale, AZ (US); Kyler Calkins, Fountain Hills, AZ (US); Jeffrey Falco, Scottsdale, AZ (US); Rawad Aboughanem, Torrance, CA (US)

(73) Assignee: Fidlco, LLC, Scottsdale, AZ (US)

( * ) Notice: Subject to any disclaimer, the term of this patent is extended or adjusted under 35 U.S.C. 154(b) by 0 days.

(21) Appl. No.: 16/123,767

(22) Filed: Sep. 6, 2018

(65) Prior Publication Data

US 2019/0069656 A1 Mar. 7, 2019

Related U.S. Application Data

(60) Provisional application No. 62/554,877, filed on Sep. 6, 2017.

(51) Int. Cl.
| | |
|---|---|
| H04M 1/02 | (2006.01) |
| A45C 11/00 | (2006.01) |
| H04B 1/3888 | (2015.01) |
| A45F 5/00 | (2006.01) |
| A45C 13/02 | (2006.01) |
| A45F 5/10 | (2006.01) |

(52) U.S. Cl.
CPC .............. *A45C 11/00* (2013.01); *A45C 13/02* (2013.01); *A45F 5/00* (2013.01); *A45F 5/10* (2013.01); *H04B 1/3888* (2013.01); *H04M 1/0249* (2013.01); *A45C 2011/002* (2013.01); *A45F 2005/008* (2013.01); *A45F 2200/0516* (2013.01)

(58) Field of Classification Search
CPC ....... A45C 11/00; A45C 13/002; A45C 13/02; A45C 2011/002; A45F 5/00; A45F 5/10; A45F 2005/008; A45F 2200/0516; H04B 1/3888; H04M 1/02; H04M 1/0249; H04M 1/0254; H04M 1/0262
USPC ................. 206/320; 455/556.1, 575.1, 575.8
See application file for complete search history.

(56) References Cited

U.S. PATENT DOCUMENTS

| | | | | |
|---|---|---|---|---|
| 5,793,619 | A * | 8/1998 | Deguchi | H01M 2/1022 455/575.8 |
| 9,049,283 | B1 * | 6/2015 | Kim | H04M 1/21 |
| 9,197,275 | B2 * | 11/2015 | Fathollahi | H04B 1/3888 |
| 9,654,605 | B2 * | 5/2017 | Goldfain | H04M 1/185 |
| 9,807,211 | B2 * | 10/2017 | Guerdrum | H04M 1/0264 |

(Continued)

FOREIGN PATENT DOCUMENTS

| | | | |
|---|---|---|---|
| CN | 207819993 U | * | 9/2018 |
| CN | 207821301 U | * | 9/2018 |

*Primary Examiner* — Bryon P Gehman
(74) *Attorney, Agent, or Firm* — Weiss Brown, PLLC (57) ABSTRACT

Embodiments of a modular mobile device and related accessories can include a mobile device case. In a number of embodiments, the mobile device case can comprise a housing. In many embodiments, the housing can comprise a front configured to hold the mobile device and a back panel comprising a first slot and a second slot. In some embodiments, the first slot and the second slot can be configured to receive a portion of a bottom frame and the bottom frame can be configured to receive one or more modules. Other embodiments of related apparatuses, methods and systems are also provided.

9 Claims, 11 Drawing Sheets

(56) References Cited

U.S. PATENT DOCUMENTS

| | | |
|---|---|---|
| 9,901,151 B2 * | 2/2018 | Marvin .................. A45C 11/00 |
| 10,058,155 B2 * | 8/2018 | Guerdrum ............... H04M 1/04 |
| 2012/0199501 A1 | 8/2012 | Le Gette |
| 2013/0220841 A1 | 8/2013 | Yang |
| 2015/0163393 A1 * | 6/2015 | Kim .................... H04M 1/0256 |
| | | 455/419 |
| 2016/0020810 A1 | 1/2016 | Platt |
| 2016/0072933 A1 | 3/2016 | Cox, III |
| 2018/0063306 A1 | 3/2018 | Scannell |

* cited by examiner

MODULAR MOBILE DEVICE CASE AND RELATED ACCESSORIES

TECHNICAL FIELD

This disclosure relates generally to cases for mobile devices, and relates more particularly to modular mobile device cases and related accessories.

BACKGROUND

Many mobile device cases do not have many uses other than protecting a mobile device. The ability to customize a case with one or more modules or accessories, which can allow the case to provide more functionality to the user. By having one or more modules with different purposes, users can choose which modules would be the most useful to them. The ability to interchange, swap out, remove, or add modules can allow the user flexibility while using the same mobile device case. Accordingly, there is a need for modular mobile device cases and related accessories.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a case for a mobile device. In many embodiments, the case can comprise a housing comprising a front configured to hold the mobile device. In many embodiments, the housing can comprise a back panel. In some embodiments, the back panel can comprise a first slot and a second slot. In many embodiments, the first slot and the second slot can be configured to receive a portion of a bottom frame and the bottom frame can be configured to receive one or more modules.

Many embodiments can include a case for a mobile device. In some embodiments, the case can comprise a housing comprising a back panel. In many embodiments, the back panel can comprise a first side comprising a first slot. In a number of embodiments, the back panel can comprise a second side comprising a second slot. In some embodiments, the case for the mobile device can comprise a frame. The frame can comprise a bottom frame and a top frame coupled to the bottom frame. In some embodiments a portion of the bottom frame is at least partially within the first slot and/or the second slot.

Various embodiments can include an accessory for a mobile device case. In some embodiments, the accessory can comprise a panel configured to attach to the mobile device case, a frame, and one or more modules removably attached to the frame. In some embodiments, the panel can comprise at least one slot configured to hold a frame at least partially within the panel.

Figure 1:
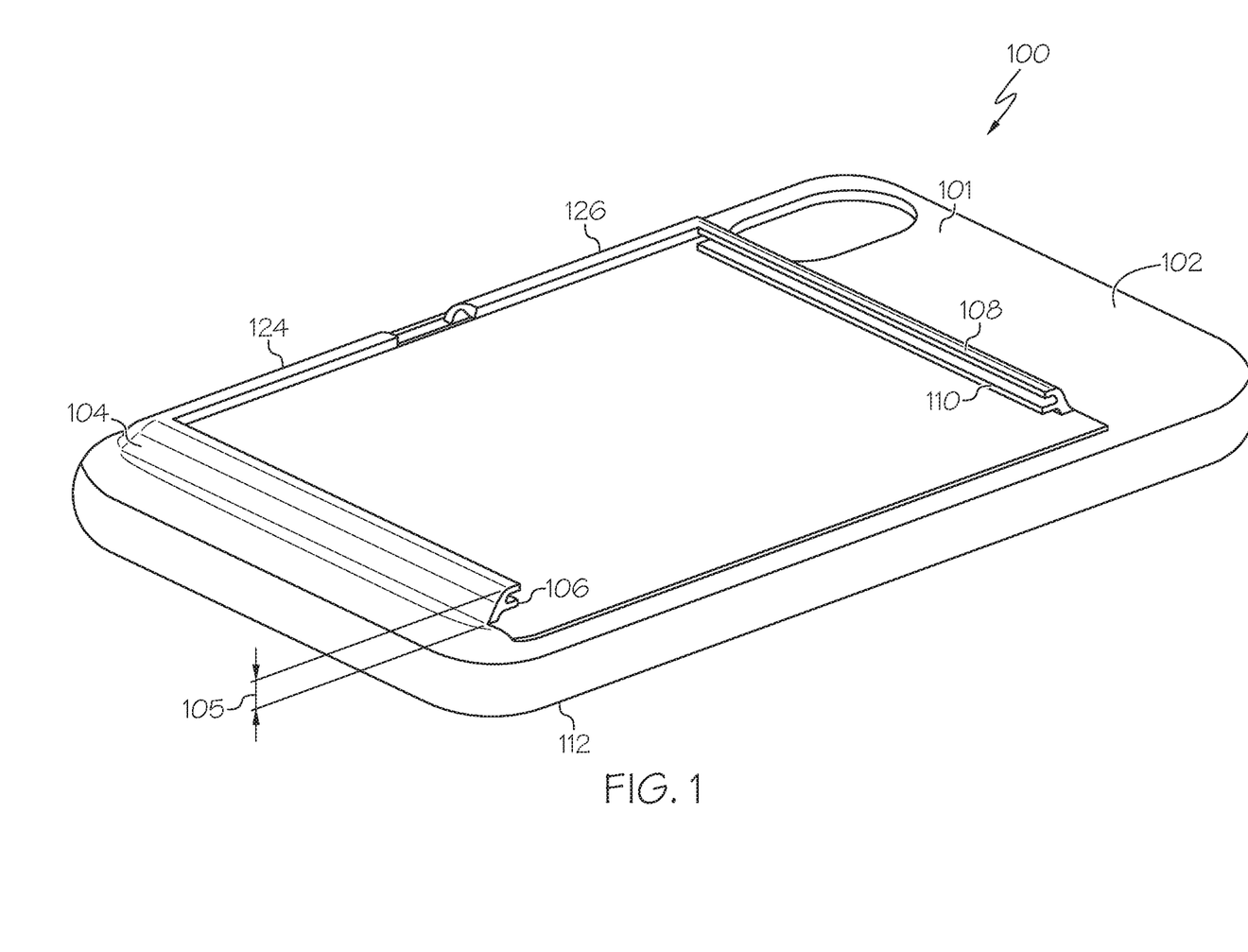
FIG. 1 illustrates a perspective view of a case, according to an embodiment.

Turning to the drawings, FIG. 1 illustrates an embodiment of a case 100 for a mobile device (not shown). In a number of embodiments case 100 can comprise a housing 101. In some embodiments, housing 101 can comprise a front 112 configured to hold the mobile device and a back panel 102. In some embodiments, back panel 102 can be removably attached to housing 101. In some embodiments, back panel 102 can be an accessory attached to any mobile device case. In various embodiments, front 112 can comprise a band that can be configured to wrap around the mobile device and secure back panel 102 to the mobile device. In other and the same embodiments, front 112 can be comprised of an elastic polymer. In many embodiments, front 112 can be contiguous with back panel 102. In some embodiments, back panel 102 can be a separate piece which can be fixed or adhered to an existing mobile device case.

Back panel 102 can comprise a first side 104 and a first slot 106. In some embodiments, back panel 102 can comprise a second side 108 and a second slot 110. Second slot 110 can be similar to first slot 106. In some embodiments, back panel 102 can comprise at least one of a third side 124 and a fourth side 126. In a number of embodiments, first side 104 can be contiguous with third side 124. In some embodiments, second side 108 can be contiguous with fourth side 126. In various embodiments, first side 104 can comprise third side 124 or second side 108 can comprise fourth side 126. In some embodiments, first side 104 can comprise second side 108, third side 124, and fourth side 126. In some embodiments, third side 124 and fourth side 126 can each comprise a slot similar to first slot 106. In some embodiments, any of first slot 106, second slot 110, third slot 124, or fourth slot 126 can comprise a single slot or two or more slots. In some embodiments, any of first slot 106 can comprise two or more sections within first slot 106, wherein the sections can be at least partially separated by a wall or edge within first slot 106. Similarly, in various embodiments, second slot 110 can comprise two or more sections within second slot 110, wherein the sections can be at least partially separated by a wall or edge within second slot 110, third slot 124 can comprise two or more sections within third slot 124, wherein the sections can be at least partially separated by a wall or edge within third slot 124, or fourth slot 126 can comprise two or more sections within fourth slot 110, wherein the sections can be at least partially separated by a wall or edge within fourth slot 110. In some embodiments, any of first slot 106, second slot 110, third slot 124, or fourth slot 126 can comprise a slot height 105. In many embodiments, slot height 105 can be approximately 0.1 millimeter (mm) to approximately 6.0 mm. In various embodiments, slot height 105 can be approximately 3.0 mm to approximately 4 mm. In some embodiments, slot height 105 can be approximately 3.5 mm. In some embodiments, slot height 105 can be approximately 4.0 mm. In some embodiments, the slot height of second slot 110 can be approximately equal to the slot height 105 of first slot 106.

Figure 2:
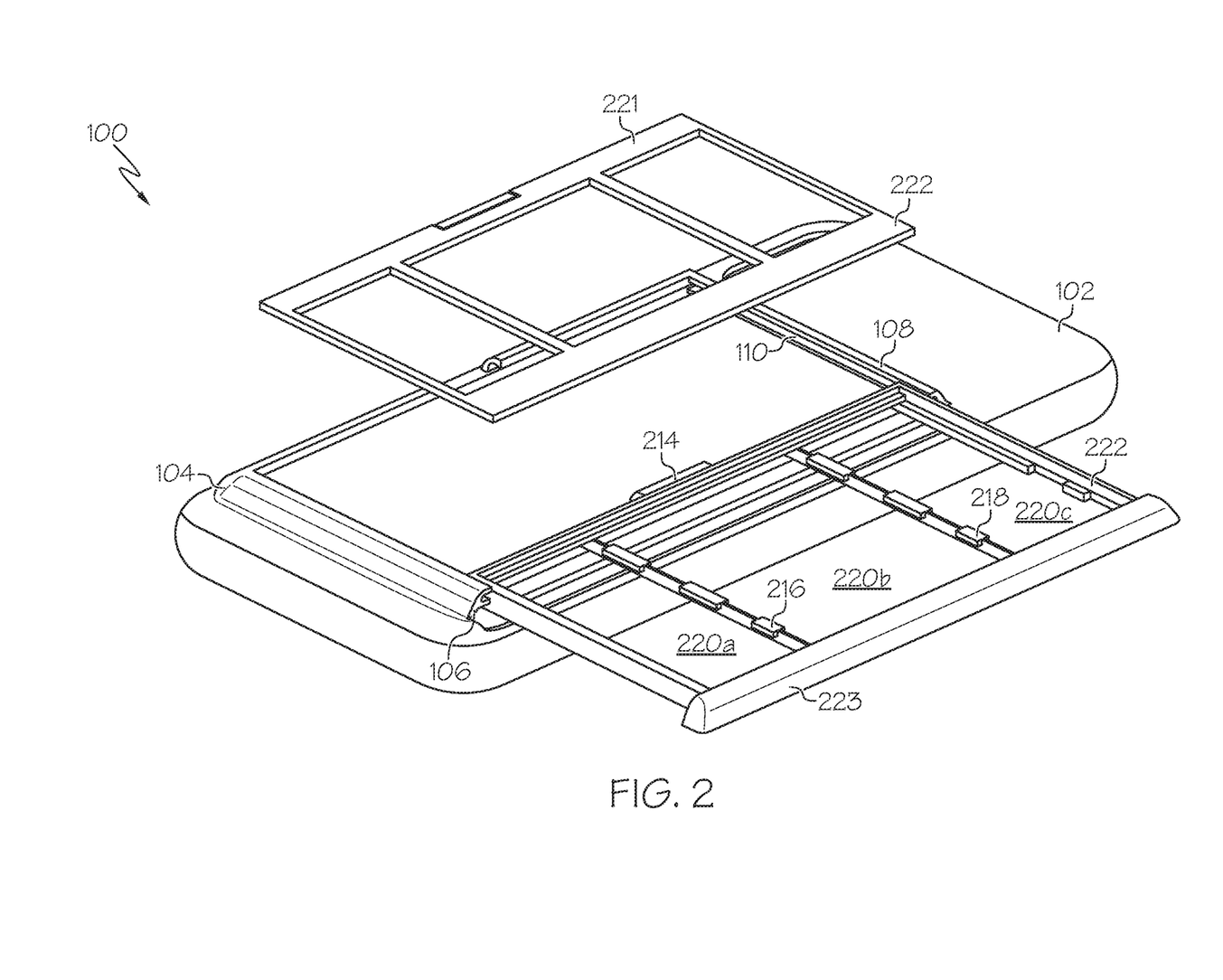
FIG. 2 illustrates a view of another embodiment of the case of FIG. 1.

FIG. 2 depicts case 100 in an embodiment. In some embodiments, case 100 further can comprise a frame 222. In some embodiments, frame 222 can comprise a slide in tray or an inset. In some embodiments, frame 222 can comprise a bottom frame 223 and a top frame 221. In some embodiments, at least one slot (e.g., first slot 106) can be configured to receive at least a portion of bottom frame 223. In some embodiments, frame 221 can fasten (e.g., snap fit or latch) into bottom frame 223. In a number of embodiments, bottom frame 223 can slide into the at least one slot (e.g., first slot 106) independently of top frame 221, and top frame 221 can fasten into bottom frame 223 prior to top frame 221 sliding into the at least one slot (e.g., first slot 106). In various embodiments, frame 222 or bottom frame 223 can latch, fasten, slide or snap into at least one slot (e.g., first slot 106). In many embodiments, bottom frame 223 can be configured to receive one or more modules (e.g., module 1000 (FIG. 10)). In the same or other embodiments, top frame 221 can be configured to receive at least one module of the one or more modules (e.g., module 1000 (FIG. 10)). In some embodiments, top frame 221 can be configured to hold the one or more modules within frame 222. In a number of embodiments, bottom frame 223 can receive one or more modules and top frame 221 can at least partially cover the modules to assist in holding the one or modules within frame 222.

In some embodiments, bottom frame 223 can be coupled to top frame 221. In various embodiments, bottom frame 223 can be configured to connect to top frame 221. As a non-limiting example, top frame 221 can be coupled or connected to bottom frame 223 through a tab and slot system, a snap system, a magnet system, a latch system, or similar fastening or connection system. In some embodiments, top frame 221 can be connected (e.g., with a hinge) to bottom frame 223 at one side. In some embodiments, bottom frame 223 can comprise a latch 214. In a number of embodiments, latch 214 can comprise a tongue and groove latch. In some embodiments, latch 214 can secure frame 222 to case 100, or in the same or other embodiments, secure top frame 221 to bottom frame 223. In various embodiments, top frame 221 can comprise a latch similar to latch 214.

Figure 3:
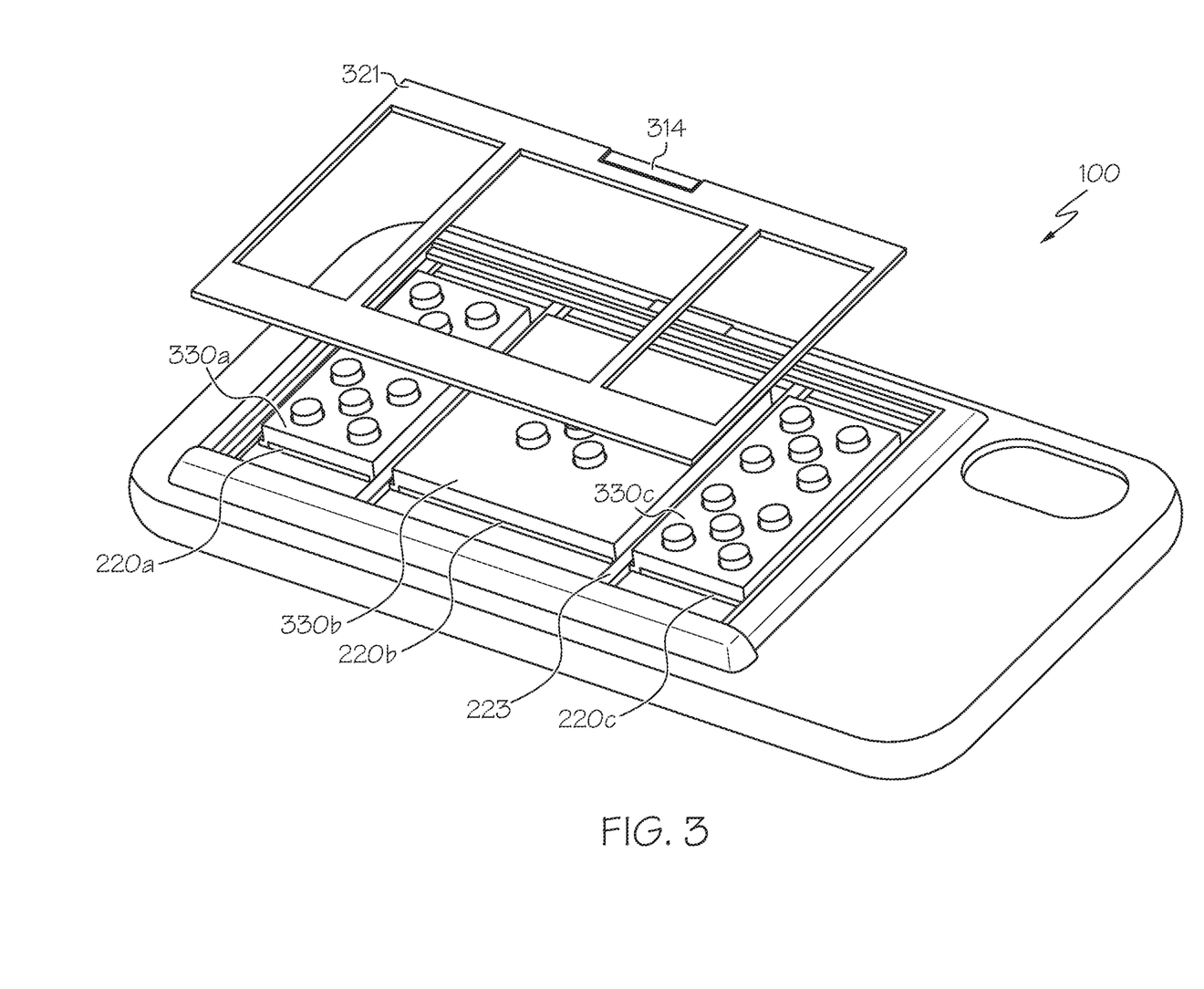
FIG. 3 illustrates a view of yet another embodiment of the case of FIG. 1.

In a number of embodiments, bottom frame 223 can comprise one or more sections (e.g., first section 220a, second section 220b, and third section 220c). In many embodiments, each of the one or more sections can be configured to receive one module of the one or more modules (e.g., module 1000 (FIG. 10)). As a non-limiting example, first section 220a can be configured to receive a first module, second section 220b, can be configured to receive a second module, and third section 220c can be configured to receive a third module. Turning briefly to FIG. 3, FIG. 3 illustrates an embodiment of case 100 where one or more modules can be received within a frame, such as bottom frame 223. As a non-limiting example, a first module 330a is placed within first section 220a, a second module 330b is placed within second section 220b, and a third module 330c is placed within third section 220c. In some embodiments, first module 330a, second module 330b, and third module 330c can be partially covered by a top frame 321. In various embodiments, top frame 321 can comprise a latch 314 similar to latch 214 (FIG. 2).

Returning to FIG. 2, in many embodiments, the at least one module of the one or more modules can be received within frame 222 or, in some embodiments, bottom frame 223, using a fastener, such as a slot and tab system, a snap system, a magnet system, or a similar fastening or connection system. In some embodiments, the at least one module of the one or more modules (e.g., module 1000 (FIG. 10)) can be received within bottom frame 223 or top frame 221 using a tab and slot system, similar to puzzle pieces. In some embodiments, bottom frame 223 can comprise at least one frame tab 216 (and similarly, in the same or other embodiments, top frame 221 can comprise at least one frame tab). In the same or other embodiments, bottom frame 223 can comprise at least one frame slot 218 (and similarly, in the same or other embodiments, top frame 221 can comprise at least one frame slot).

Figure 10:
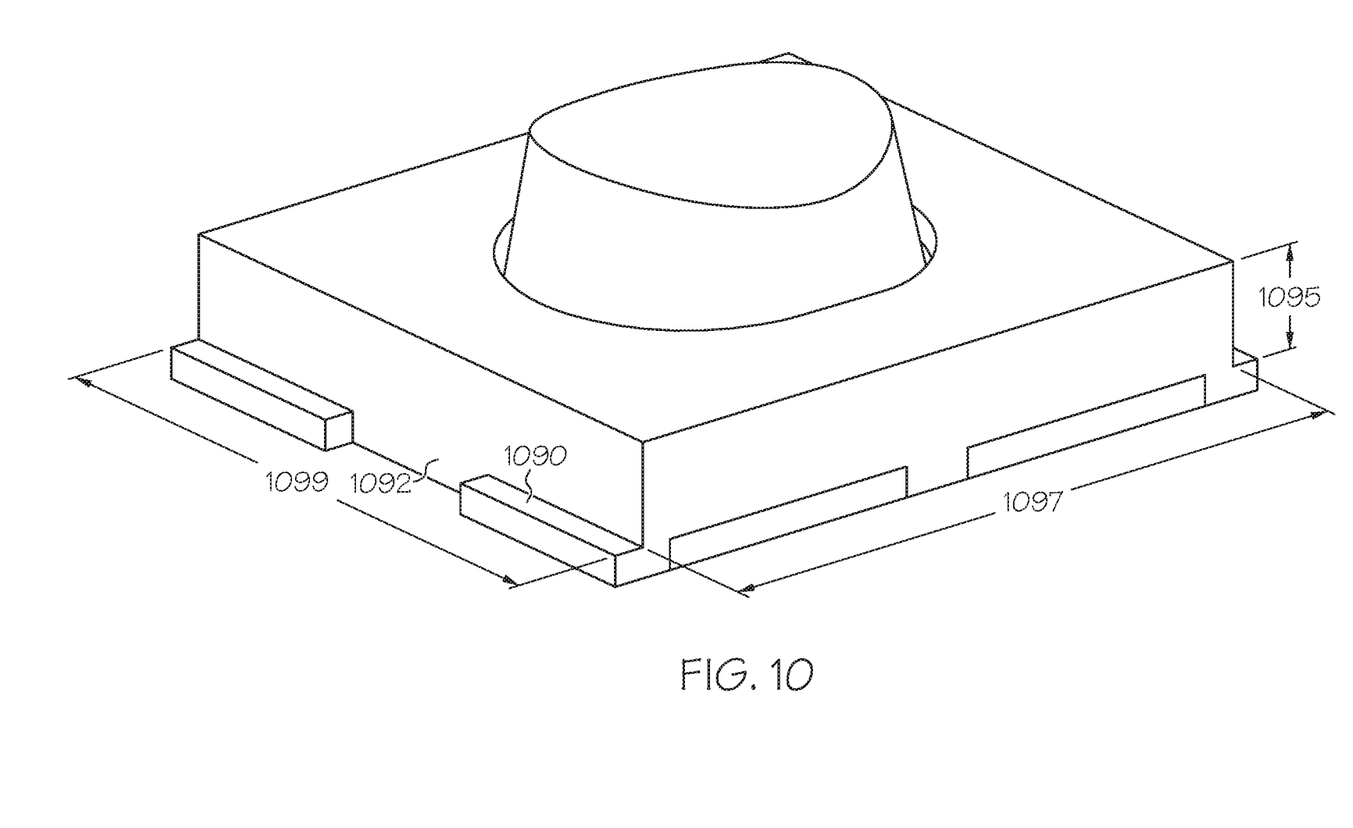
FIG. 10 illustrates a perspective view of a module, according to an embodiment.
Figure 11:
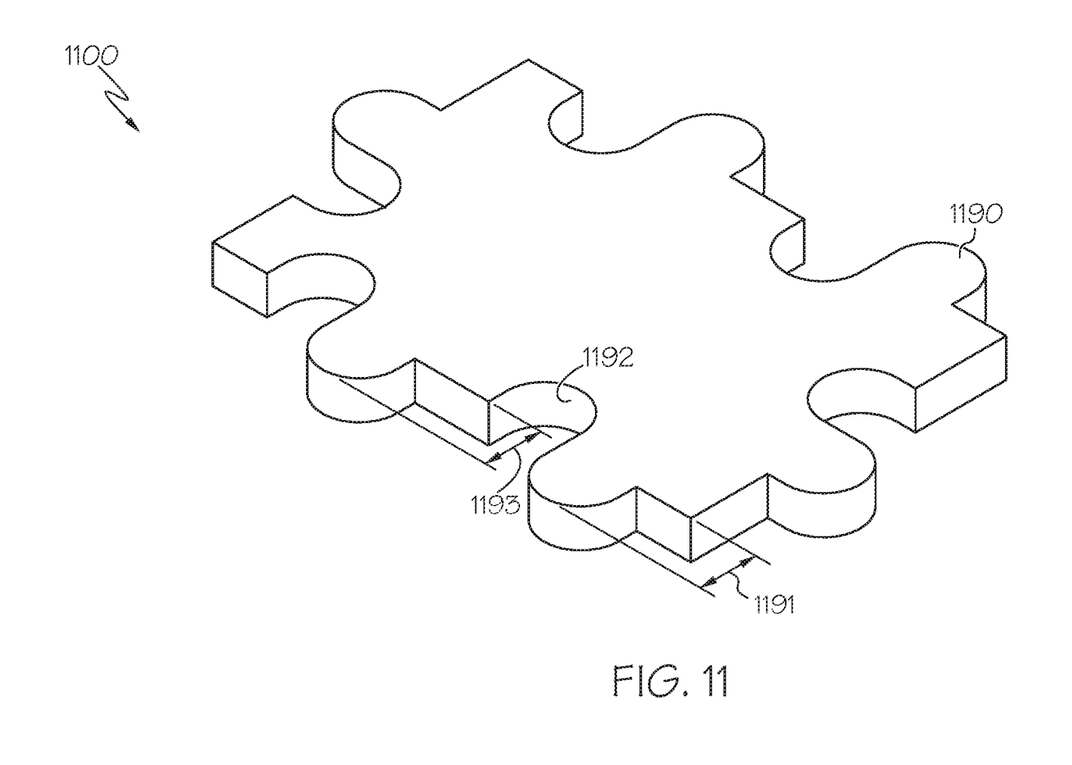
FIG. 11 illustrates a perspective view of a module, according to another embodiment.

Turning briefly to FIGS. 10-11, FIG. 10 illustrates an embodiment of a module 1000 (which can be similar to first module 430*a* (FIG. 4), second module 430*b* (FIG. 4), and/or third module 430*c* (FIG. 4)). In many embodiments, module 1000 is a non-limiting example of the one or more modules. Module 1000 comprises a rocker switch and can be a fidget module (as described further below. In many embodiments, module 1000 can comprise at least one module tab 1090. In some embodiments, module 1000 can comprise at least one module slot 1092. In various embodiments, the at least one module of the one or more modules (e.g. module 1000) can be removably attached to bottom frame 223 by inserting module tab 1090 into one frame slot 218. In the same or other embodiments, the at least one module of the one or more modules (e.g. module 1000) can be removably attached to bottom frame 223 by inserting the at least one frame tab 216 into module slot 1092. In some embodiments, module 1000 similarly can be removably attached to top frame 221. In some embodiments, module 1000 can comprise a length 1097 of approximately 10 millimeters (mm) to approximately 90 mm. In some embodiments, module 1000 can comprise a width 1099 of approximately 10 mm to approximately 90 mm. In some embodiments, module 1000 can comprise a height 1095 of approximately 2 mm to approximately 40 mm. In a number of embodiments, height 1095 can comprise approximately 2 mm to approximately 20 mm. In some embodiments, height 1095 can comprise approximately 5 mm to approximately 15 mm.

FIG. 11 illustrates an embodiment of a module 1100 which can be similar, but not identical to module 1000 (FIG. 10). In some embodiments, module 1100 can comprise one or more tabs 1190. In various embodiments, module 1100 can comprise one or more slots 1192. In some embodiments, module 1100 can comprise one or more tabs 1190 and one or more slots 1192. In a number of embodiments, module 1100 can only comprise one or more tabs 1190. In some embodiments, module 1100 can only comprise one or more slots 1192. In some embodiments, tab 1190 can comprise a tab depth 1191 of approximately 0.5 mm to approximately 4 mm. In some embodiments, slot 1192 can comprise a slot depth 1193 of approximately 0.5 mm to approximately 4 mm. In many embodiments tab depth 1191 can be approximately equivalent to slot depth 1193.

Figure 4:
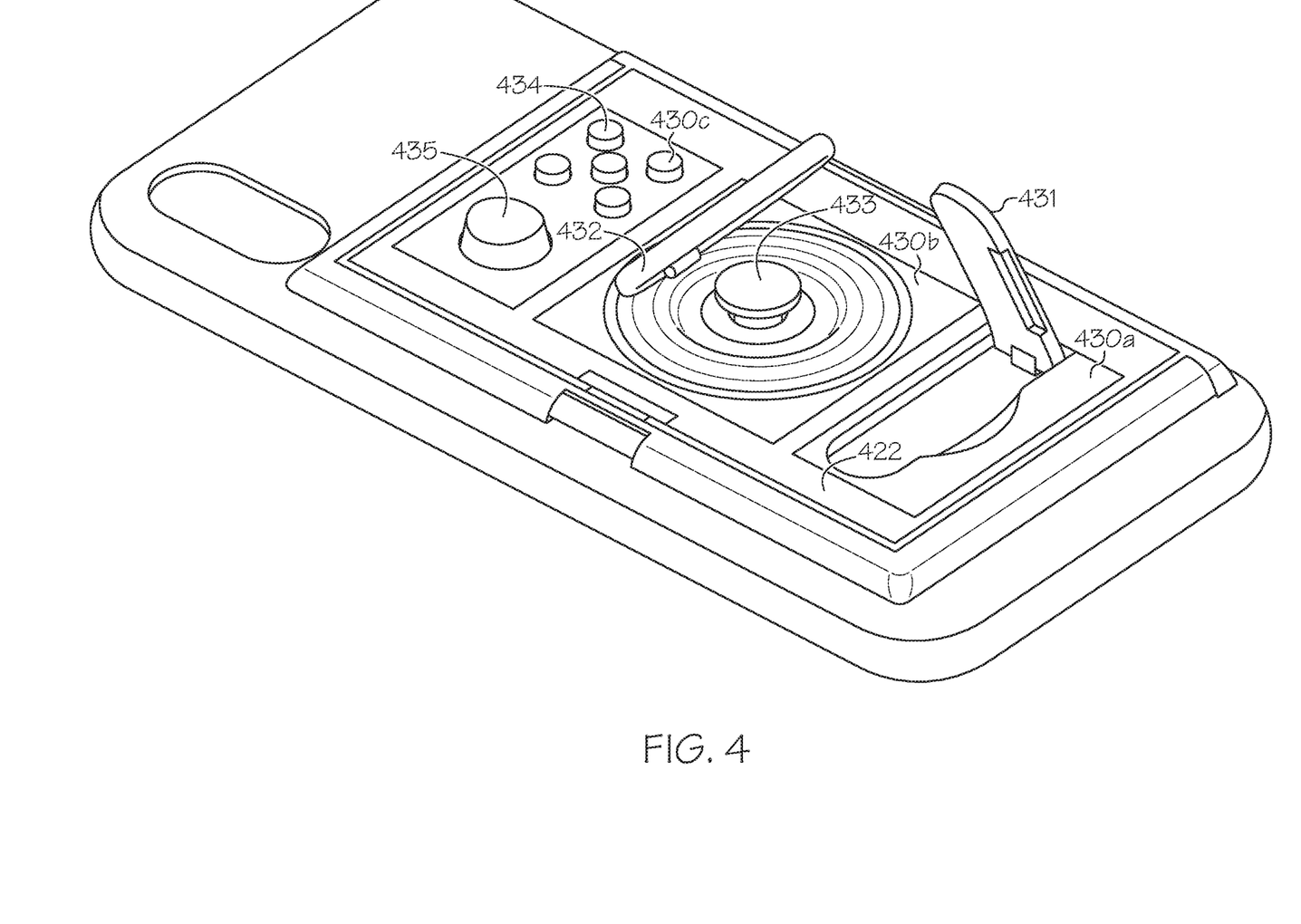
FIG. 4 illustrates a perspective view of a case, according to another embodiment.

Turning to FIG. 4, FIG. 4 illustrates an embodiment of a case 400, which can be similar to case 100, with three sections of a frame 422 filled with modules, first module 430*a*, second module 430*b*, and third module 430*c*. In some embodiments, third module 430*c* can comprise two separate modules coupled together to form a larger module. In most embodiments, second module 430*b* can comprise one large square module, 2 separate rectangular modules, or 4 separate square modules. In some embodiments, any of first module 430*a*, second module 430*b*, or third module 430*c* can comprise two separate modules coupled together to form a larger module. In the same or other embodiments, any of first module 430*a*, second module 430*b*, or third module 430*c* can comprise three, four, five, six, seven, or eight separate modules coupled together to form a larger module. In some embodiments, case 400 can comprise one, two, three, four, five, six, seven, or eight sections. In some embodiments, third module 430*c* can be coupled together using the tab and slot system as described above and as shown in FIG. 10, a tab and slot system, a snap system, a magnet system, a latch system, or similar fastening or connection system. In some embodiments, the one or more modules (e.g., first module 430*a*, second module 430*b*, and/or third module 430*c*) can comprise a fidget module, a utility module, or a style module (as further described below). In some embodiments, the one or more modules can comprise a module that includes a combination of a fidget module, a utility module, and/or a style module. In a non-limiting example, first module 430*a* comprises a stand 431 and is an example of a utility module, second module 430*b* comprises a grip 432 (which is a utility module) and a joystick or thumbstick 433 (which can be a fidget module), and third module 430*c* comprises buttons 434 and rocker switch 435, each which can be a fidget module, a utility module, or a style module (as an example, the buttons 434 or rocker switch 435 can provide tactile stimulation (e.g., a fidget module), turn on or off one or more lights, sounds, or other electrical device (e.g., a utility module or style module depending on the usefulness of the lights, sounds, or other electrical device).

In some embodiments, the fidget module can be referred to as a tactile stimulation device. In some embodiments, the fidget module can comprise a mechanical device. In some embodiments, the mechanical device can be actuated for tactile stimulation. In some embodiments, the fidget module can comprise at least one of a gear, a spinner, a slide, a button, a dial, a thumbstick, a switch, or similar movement device. In some embodiments, the utility module can comprise at least one of one or more lights (e.g., a flashlight), a sound (e.g., an alarm), a pill box, a storage compartment, a bottle opener, a tool, a card holder, a grip, a camera attachment, a phone stand, or similar useful device. In various embodiments, the style module can comprise at least one of, one or more lights, a sound module, a heat-sensitive color changing module, a logo, a picture, a charm, a textured cover, a colored cover, a decorative cover, or similar decorative module.

Figure 5:
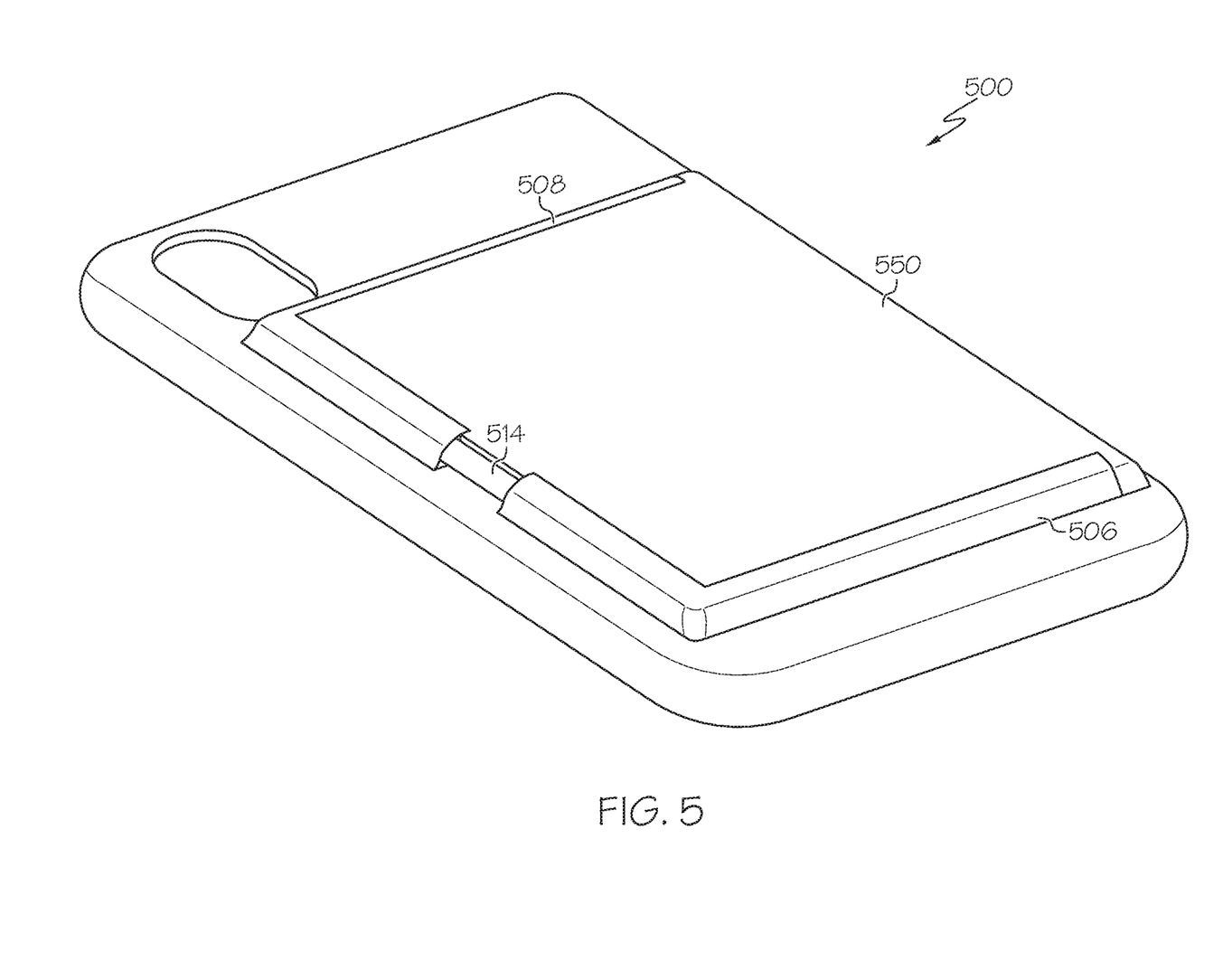
FIG. 5 illustrates a perspective view of a case, according to yet another embodiment.
Figure 6:
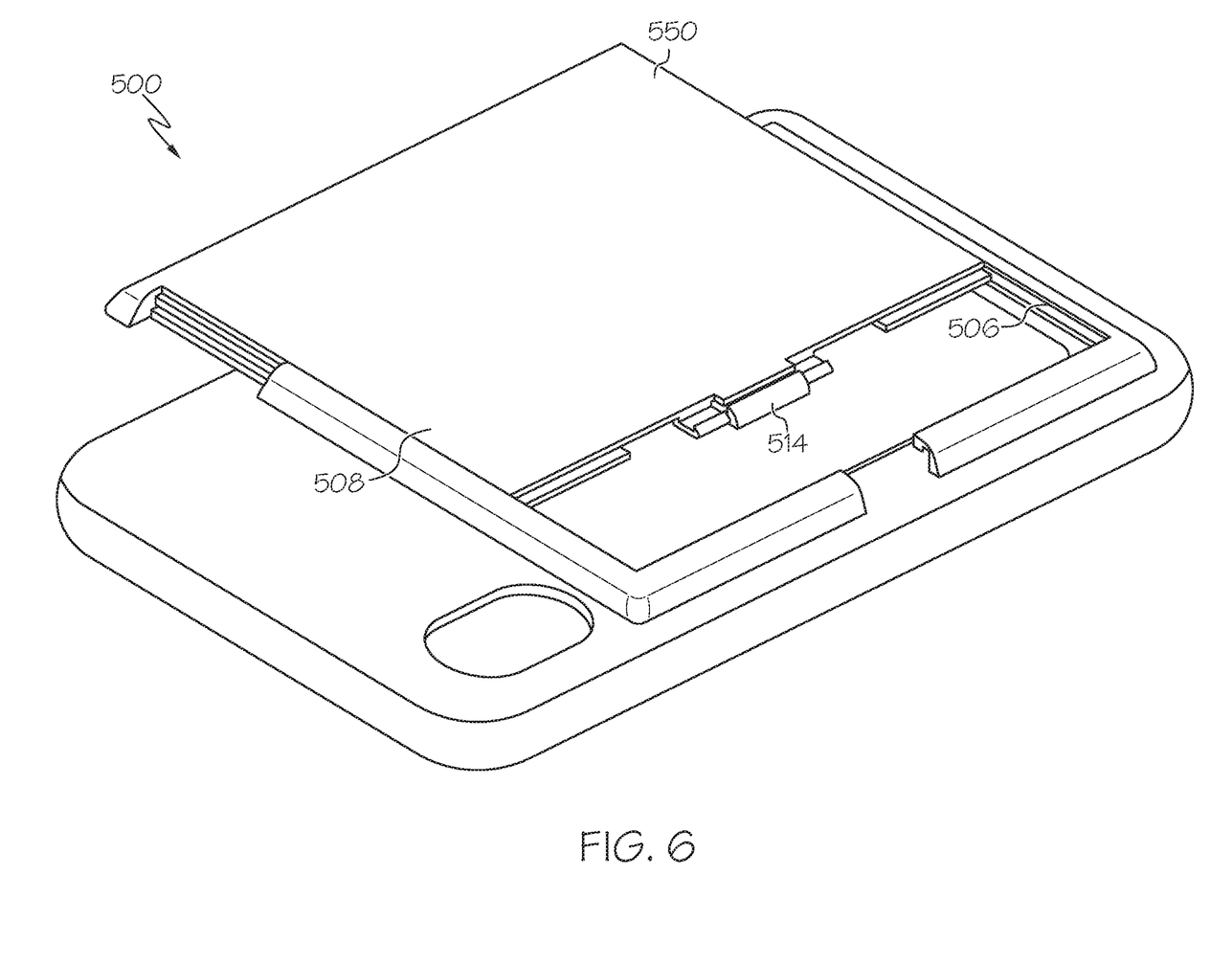
FIG. 6 illustrates another view of the case according to the embodiment of FIG. 5.

Discussing to FIGS. 5 and 6 together, case 500, which can be similar to case 100, illustrates an embodiment of a case for a mobile device (not shown) comprising a single module 550. Module 550 can slide into one or more slots 506 or 508. In some embodiments, module 550 can fasten to case 500 via latch 514 (which can be similar to latch 214 (FIG. 2)). In the same or other embodiments, module 550 can be a frame (e.g., frame 122 (FIG. 1) or received within a frame (e.g., frame 122 (FIG. 1)). In various embodiments, module 550 can be a cover for a back panel (e.g., back panel 102 (FIG. 1). In some embodiments, when used as a cover, module 550 can be a style module (e.g., can comprise a logo, color, or other design). In a non-limiting example, module 550 can comprise a power source and one or more lights, sounds, or other electronic device. In some embodiments, module 550 can comprise a pocket or a holder to carry a business card, a credit card, an identification, or a similarly sized object.

Figure 7:
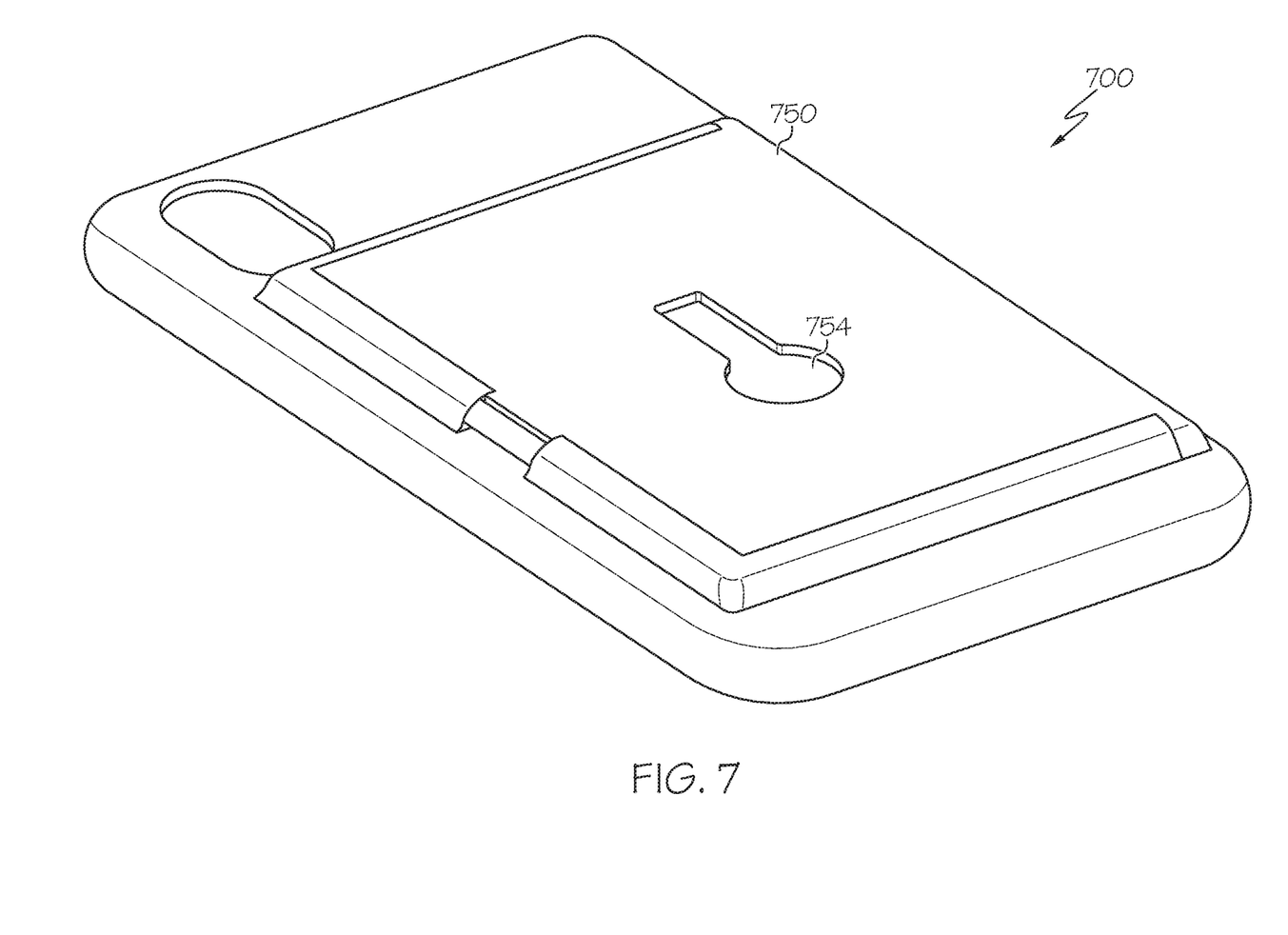
FIG. 7 illustrates a perspective view of a case, according to another embodiment.
Figure 8:
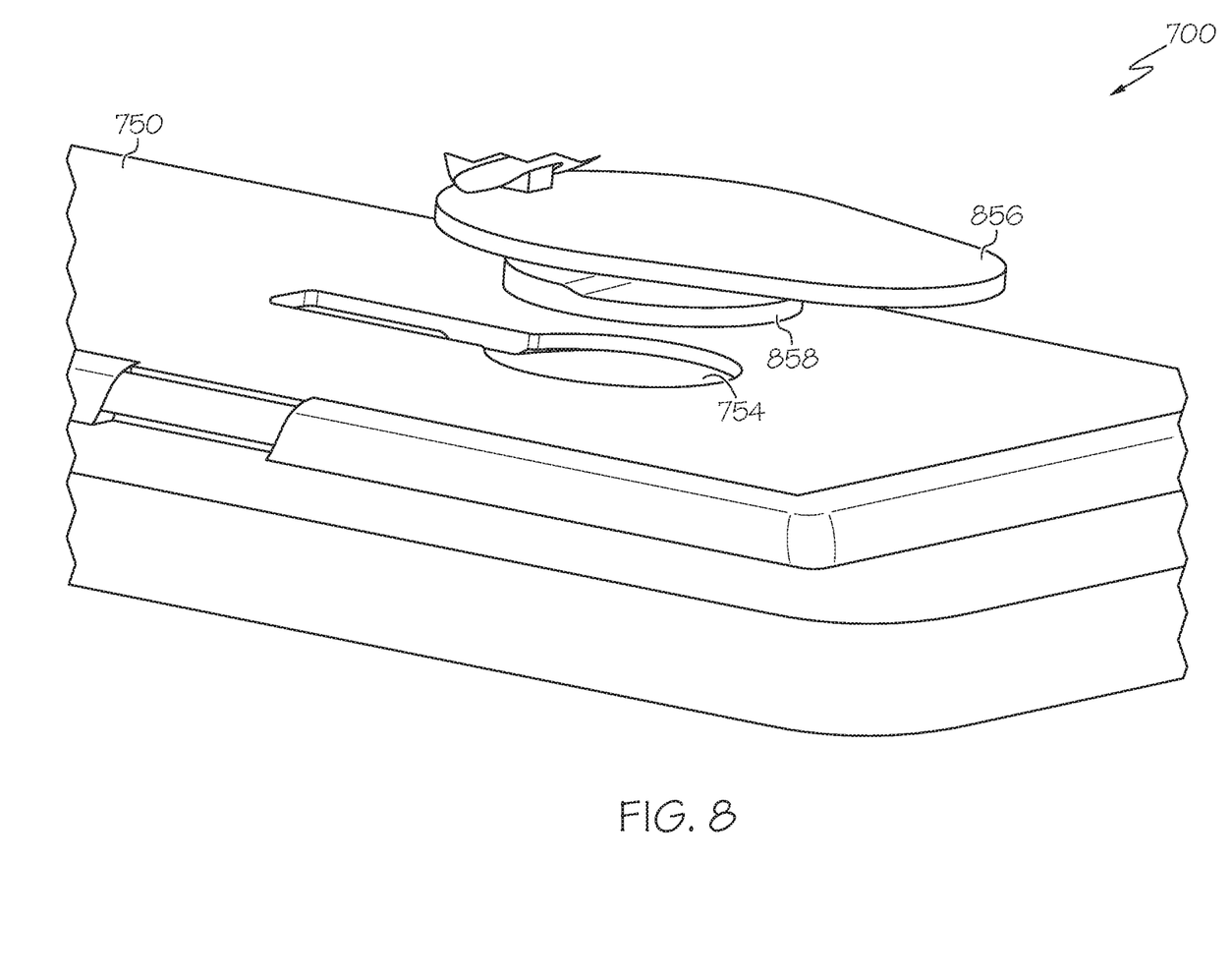
FIG. 8 illustrates a view of an attachment system of an accessory, according to the embodiment of FIG. 7.
Figure 9:
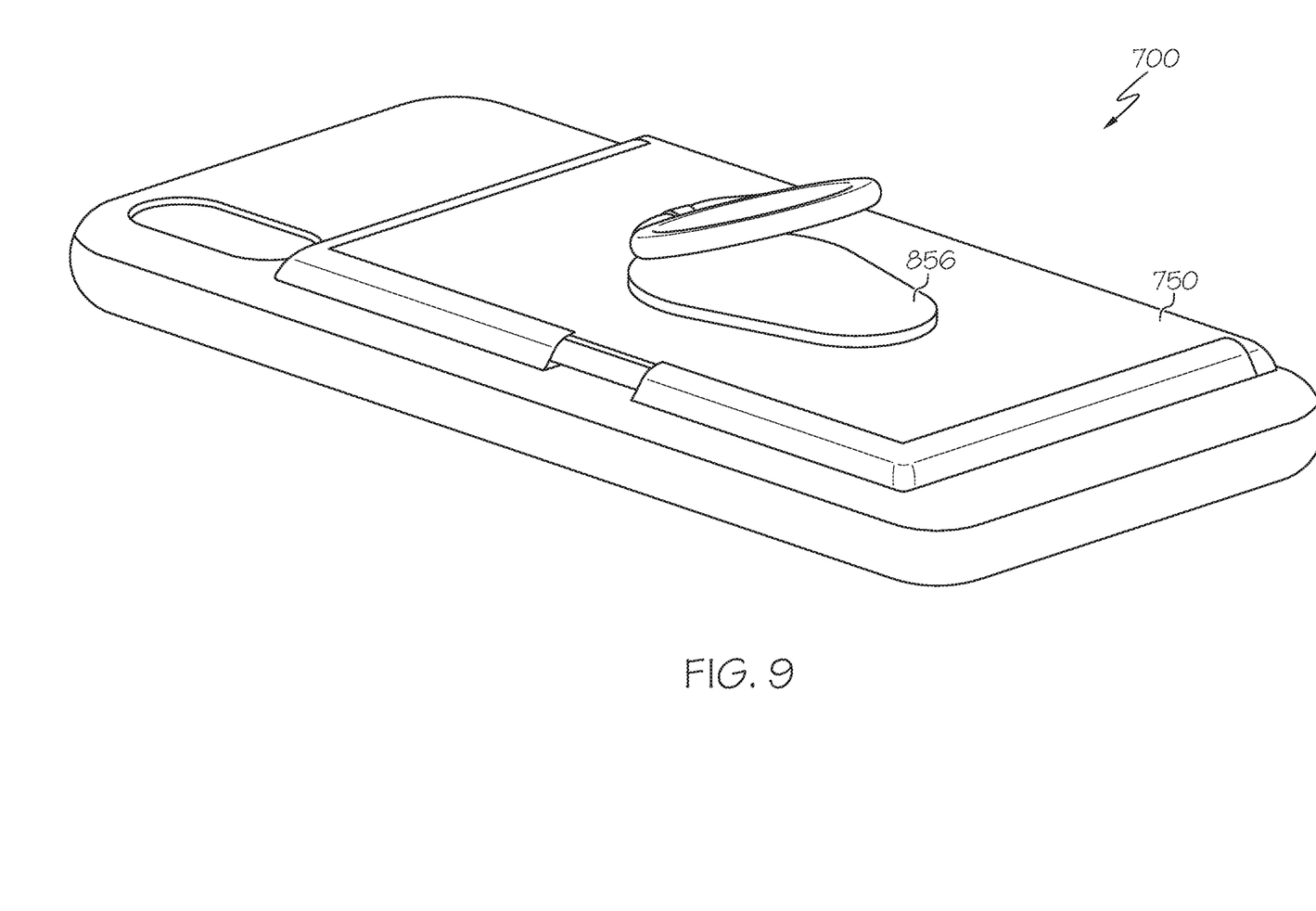
FIG. 9 illustrates a view of an accessory, according to the embodiment of FIG. 7.

Turning to FIGS. 7-9 and discussing the figures together, case 700, which can be similar to case 100, shows a module 750, which can be similar to module 550 (FIG. 5). Module 750 illustrates a module with a slot 754 which can be used to attach an accessory, such as the combination grip and stand accessory 856 (as shown in FIG. 8, which illustrates a close up view of slot 754 and accessory 856). As shown in FIG. 8, accessory 856 comprises a tab 858 which can be placed in slot 754 to removably attach accessory 856 to module 750. FIG. 9 illustrates a view of case 700 with accessory 856 fully inserted into module 750.

Although a modular case for mobile devices and related accessories have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A case for a mobile device, comprising:
   a housing comprising:
      a front; and
      a back panel comprising:
         a first slot; and
         a second slot; and
   at least one module comprising a module tab and a module slot;
   wherein:
      the first slot and the second slot receive a portion of a bottom frame;
      the bottom frame comprises:
         a frame tab; and
         a frame slot; and
      the at least one module is removably attached to the bottom frame by inserting the module tab into the frame slot and inserting the frame tab into the module slot.

2. The case for the mobile device of claim 1, wherein:
   the bottom frame is further configured to connect to a top frame.

3. The case for the mobile device of claim 2, wherein:
   the bottom frame comprises a latch configured to at least partially connect the bottom frame to the top frame.

4. The case for the mobile device of claim 2, wherein:
   the top frame is configured to hold the at least one module within the top frame.

5. The case for the mobile device of claim 1, wherein:
   the bottom frame comprises a first section and a second section;
   the first section is configured to receive a first module; and
   the second section is configured to receive a second module.

6. An accessory for a mobile device case, comprising:
   a panel configured to attach to the mobile device case, wherein the panel comprises at least one slot configured to hold a frame;
   the frame; and
   one or more modules removably attached to the frame;
   wherein:
      the frame comprises:
         at least one frame tab; and
         at least one frame slot;
      at least one module of the one or more modules comprises a module tab and a module slot; and
      the at least one module of the one or more modules is removably attached to the frame by inserting the module tab into the at least one frame slot and inserting the at least one frame tab into the module slot.

7. The accessory for the mobile device case of claim 6, wherein:
   the frame comprises a bottom frame and a top frame;
   a portion of the bottom frame is at least partially within the at least one slot; and
   the one or more modules are disposed between the bottom frame and the top frame.

8. The accessory for the mobile device case of claim 6, wherein:
   at least one module of the one or more modules comprises at least one of:
      a fidget module;
      a utility module; or
      a style module.

9. The accessory for the mobile device case of claim 6, wherein:
   each of the one or more modules comprises a module height of approximately 2 millimeters (mm) to approximately 40 mm.

\* \* \* \* \*